(12) United States Patent
Qian

(10) Patent No.: US 7,359,095 B2
(45) Date of Patent: Apr. 15, 2008

(54) APPARATUS USED WITH SCANNER FOR HOLDING TRANSPARENT OBJECTIVE FILM

(75) Inventor: Ming Kuan Qian, Taizhou (CN)

(73) Assignee: Benq Corporation, Taoyuan (TW)

( * ) Notice: Subject to any disclaimer, the term of this patent is extended or adjusted under 35 U.S.C. 154(b) by 1003 days.

(21) Appl. No.: 10/786,220

(22) Filed: Feb. 25, 2004

(65) Prior Publication Data
US 2004/0169897 A1 Sep. 2, 2004

(30) Foreign Application Priority Data
Feb. 27, 2003 (TW) .............................. 92203076 U

(51) Int. Cl.
*H04N 1/04* (2006.01)
*H04N 1/46* (2006.01)
*G03G 15/00* (2006.01)

(52) U.S. Cl. ...................... 358/487; 358/506; 358/474; 399/377

(58) Field of Classification Search ................ 358/487, 358/506, 474; 399/377, 378; 355/75, 76
See application file for complete search history.

(56) References Cited

U.S. PATENT DOCUMENTS

| | | | |
|---|---|---|---|
| 5,764,493 A * | 6/1998 | Liao ........................... | 362/602 |
| 6,404,515 B1 * | 6/2002 | Onda et al. ................. | 358/474 |
| 6,714,324 B1 * | 3/2004 | Kurosawa et al. .......... | 358/487 |
| 2001/0035491 A1 * | 11/2001 | Ochiai et al. ............ | 250/208.1 |

* cited by examiner

*Primary Examiner*—Houshang Safaipour
(74) *Attorney, Agent, or Firm*—Snell & Wilmer L.L.P.

(57) ABSTRACT

A film holding apparatus for use with a scanner is provided. The film holding apparatus selectively holds a positive film and a negative film that are to be scanned. The positive film is thicker than the negative film. The film holding apparatus includes a base, a plate disposed above the base, and a pressing unit disposed above the plate. The plate has a surface for selectively receiving a positive film and a negative film. When the surface of the plate receives the positive film, the plate vertically moves for a distance toward the base. When the surface of the plate receives a negative film, the negative film is held between the surface of the plate and the pressing unit.

18 Claims, 5 Drawing Sheets

APPARATUS USED WITH SCANNER FOR HOLDING TRANSPARENT OBJECTIVE FILM

CROSS-REFERENCE TO RELATED APPLICATIONS

This application claims priority of Taiwan Patent Application Serial No. 092203076 entitled "Transparent Objective Film Holding Apparatus for Use with Scanner", filed Feb. 27, 2003.

FIELD OF INVENTION

The present invention relates generally to a scanner, and more particularly, to a film holding apparatus used with a scanner for selectively holding a positive film and a negative film.

BACKGROUND OF THE INVENTION

Because of the popular use of multimedia technologies these days, scanners have played an increasingly important role in imaging peripherals. As required by various customers, more and more different kinds of image types are to be scanned by scanners, such as negative or positive films.

As a result, scanner manufacturers have launched positive film scanners and negative film scanners. Such scanners, however, have been designed typically to function solely as a positive film scanner or a negative film scanner, or as a scanner equipped with additional devices for holding positive films or negative films. If a user has a great number of positive and negative films to process during a short period of time, the user will have to switch between different types of scanners frequently, which leads to inefficiency of work. In addition, during the scanning process, positive and negative films in some occasions cannot be kept at the same place within the current film holding apparatus, which makes the procedures of scanning more complicated to users.

SUMMARY OF THE INVENTION

One aspect of the present invention is to provide a film holding apparatus used with a scanner for selectively holding a positive film and a negative film that are to be scanned.

Another aspect of the present invention is to provide a film holding apparatus for use with a scanner, which can efficiently carry transparent objects of different thickness to be scanned, such as positive films or negative films.

The film holding apparatus of the present invention includes a base having a surface, a plate and a pressing unit. The plate is vertically movably disposed above the surface of the base. The plate has a surface for selectively receiving a positive film and a negative film, which are to be scanned. The positive film generally includes a film with a frame, so that the positive film is thicker than the negative film. The pressing unit is disposed above the plate. When the surface of the plate receives the positive film to be scanned, the plate moves vertically toward the base for a distance preferably equal to the thickness of the positive film. When the surface of the plate receives the negative film to be scanned, the negative film will be held between the surface of the plate and the pressing unit.

BRIEF DESCRIPTION OF THE DRAWING

To explain the principle of the present invention, the appended drawings of the preferred embodiment are described as follows. The similar number in drawings represents the similar device, wherein.

DETAILED DESCRIPTION

The present invention provides a film holding apparatus for use with a scanner. The film holding apparatus is configured to selectively hold one of two films of different thickness, such as a positive film 22 and a negative film 32 that are to be scanned, shown in FIGS. 2b and 3b respectively. The positive film 22 generally includes a film 221 with a frame 222 (such as a slide shown in FIG. 2b) so that the positive film 22 is thicker than the negative film 32.

Figure 1A:
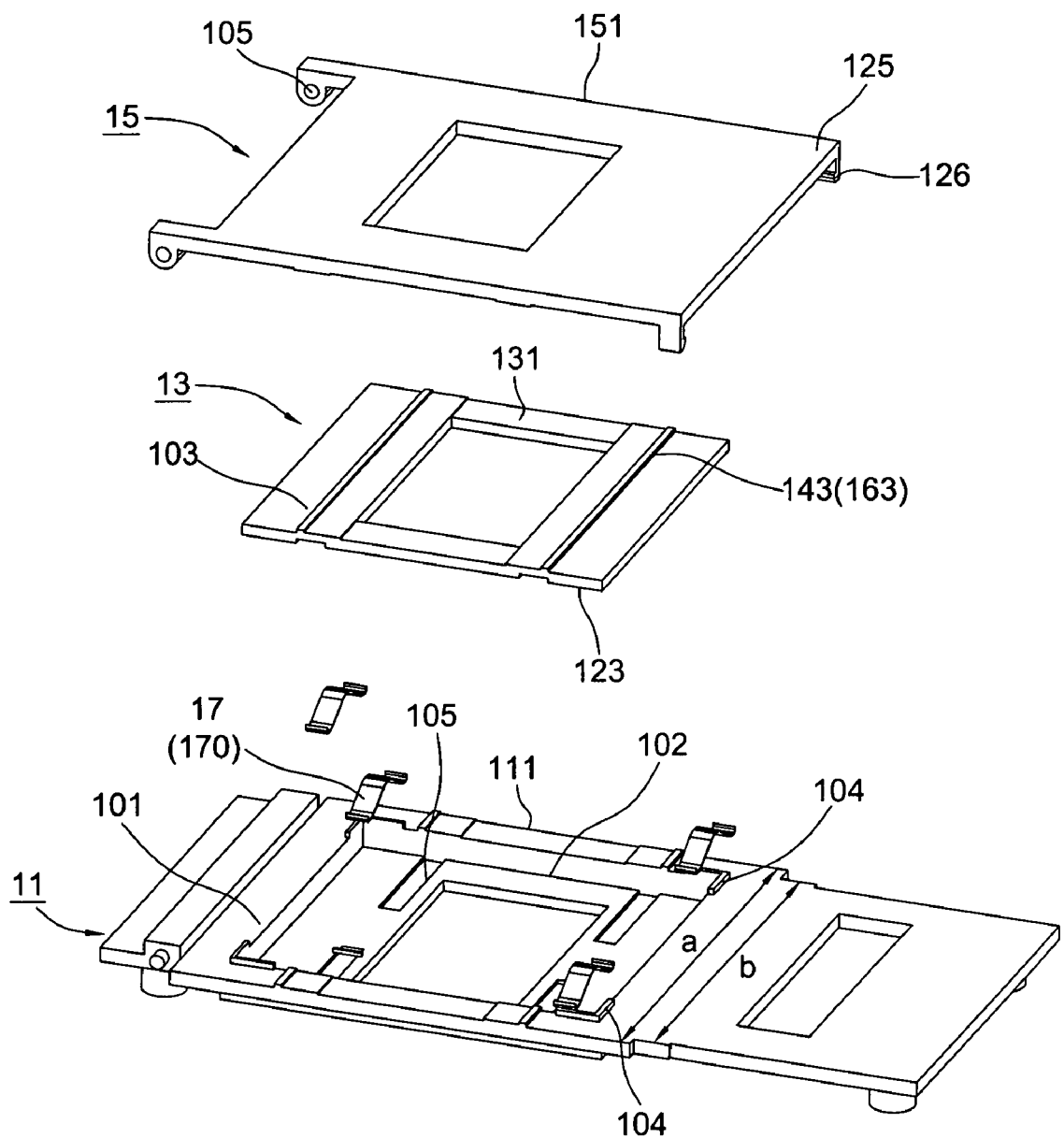
FIG. 1a is an explosive view of a film holding apparatus in one embodiment of the present invention.
Figure 1B:
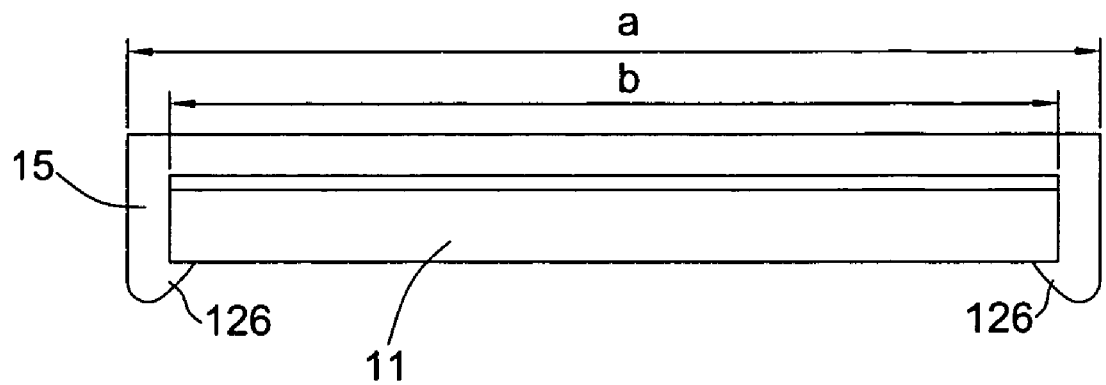
FIG. 1b is a schematic view illustrating the pressing unit engaging with the base in accordance with the embodiment of FIG. 1a of the present invention.
Figure 1C:
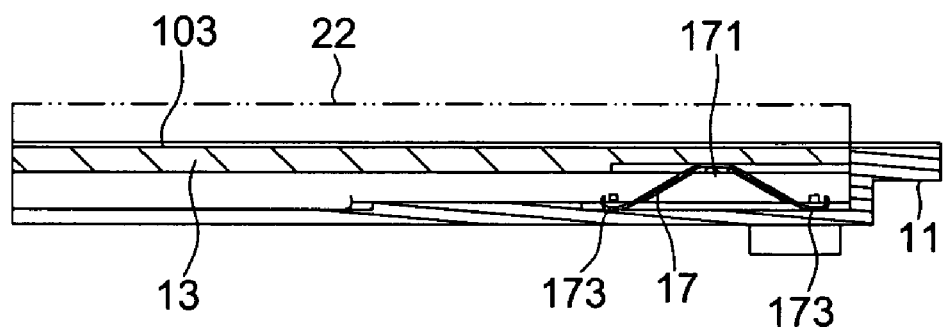
FIG. 1c depicts that the spring leaf remains in an original state with the positive film lying on the surface of the plate in one embodiment of the present invention.

FIG. 1a is an explosive view of an exemplary film holding apparatus of one embodiment of the present invention. As shown in FIG. 1a, the exemplary film holding apparatus includes a base 11, a plate 13, and a pressing unit 15. The plate 13 is vertically movably disposed above the base 11, and the pressing unit 15 is disposed above the plate 13. When the film holding apparatus is assembled, the pressing unit 15 movably engages with the base 11, and therefore the plate 13 is vertically movably disposed between the base 11 and the pressing unit 15. The plate 13 has a surface 103 for selectively receiving a positive film 22 or a negative film 32 that are to be scanned, respectively as shown in FIG. 1c and FIG. 3b. The film holding apparatus further includes an elastic element 17 disposed between the surface 101 of the base 11 and the plate 13. As shown in FIG. 1a, four cavities 105 are formed in the base 11 and configured to accommodate the elastic elements 17. When the surface 103 of the plate 13 receives a positive film 22 or a negative film 32, the plate 13 vertically moves towards the base 11, and the elastic element 17 provides the plate 13 with a resilient force. Moreover, when the surface 103 of the plate 13 receives a positive film 22 or a negative film 32, the pressing unit 15 movably engages with the base 11, and thereby provides the positive film 22 or the negative film 32 with a pressing force to stay at a predetermined position. In other words, the elastic element 17 provides the plate 13 with a resilient force when the plate 13 receives the film to be scanned, while the pressing unit 15 provides the plate 13 with a pressing force so as to maintain the film to be scanned at a predetermined position. Therefore, with the cooperation of the elastic element 17 and the pressing unit 15, the film to be scanned of different thickness accommodated in the film holding apparatus of the present invention can be maintained at the predetermined position while being scanned.

In this exemplary film holding apparatus, the pressing unit 15 movably engages with the base 11 with one end 105 pivotally coupled to the corresponding portion of the base 11, as shown in FIG. 1a. The pressing unit 15 has another end 125 with at least one latch 126 for engaging with each side of the base 11, as shown in FIG. 1b. FIG. 1b depicts the pressing unit 15 engaging with the base 11 in accordance with the embodiment of the present invention, wherein characters, "a" and "b", of the pressing unit 15 correspond to those of the base 11 as shown in FIG. 1a.

In one exemplary embodiment, the elastic element 17 can be a spring leaf disposed between the plate 13 and the base 11. The base 11 further includes a recess 102 in surface 101. The spring leaf 17 has a contact portion 171 and two engaging ends 173. The contact portion 171 of the spring leaf 17 is in contact with the bottom surface 123 of the plate 13, and the two engaging ends 173 are accommodated in the corresponding portions of the recess 102, as shown in FIGS. 1a and 1c. When the plate 13 receiving the film to be scanned vertically moves downward to be accommodated in the recess 102, the spring leaf 17 provides the plate 13 with a resilient force. FIG. 1c depicts that the spring leaf 17 remains in an original state with the positive film 22 lying on the surface 103 of the plate. In another exemplary embodiment, the elastic element 17 can be a spring (not illustrated). In this case, the spring has one end in contact with the bottom surface 123 of the plate 13 and another end accommodated in the corresponding portion of the recess 102.

Figure 2A:
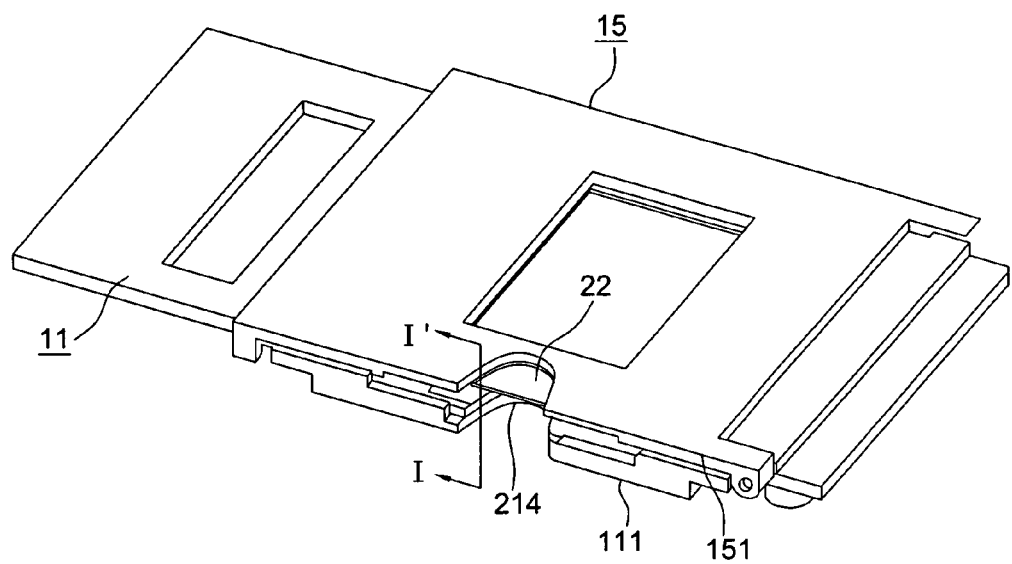
FIG. 2a depicts an exemplary film holding apparatus for holding a positive film to be scanned in accordance with one embodiment of the present invention.
Figure 2B:
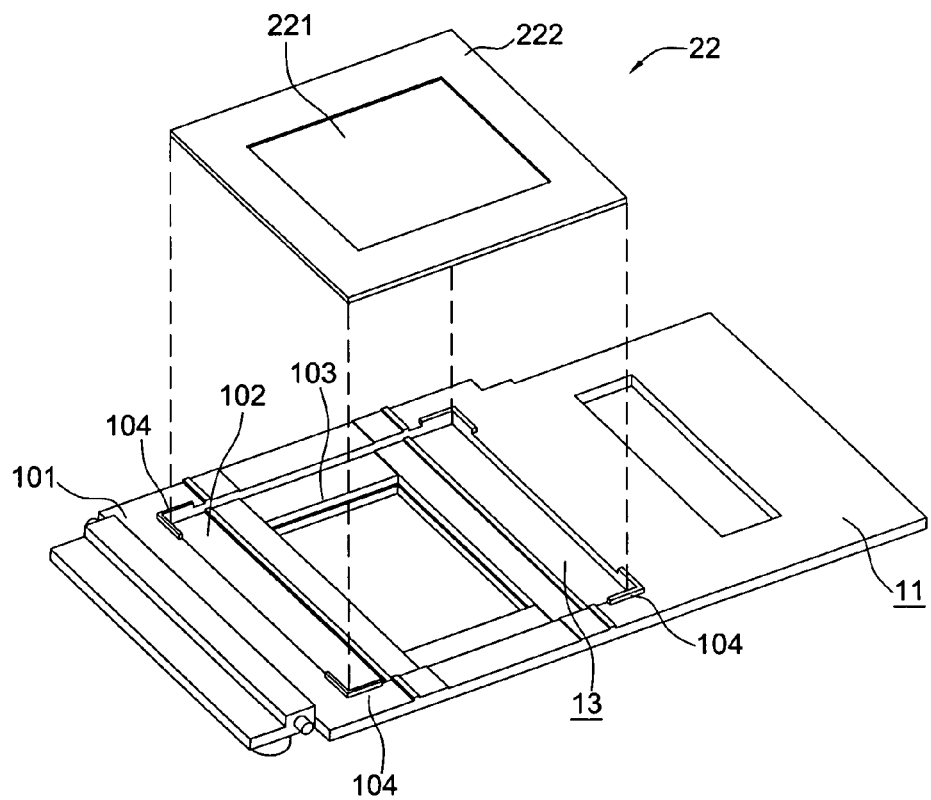
FIG. 2b depicts that the plate that vertically moves downwards and into the recess in accordance with one embodiment of the present invention.
Figure 2C:
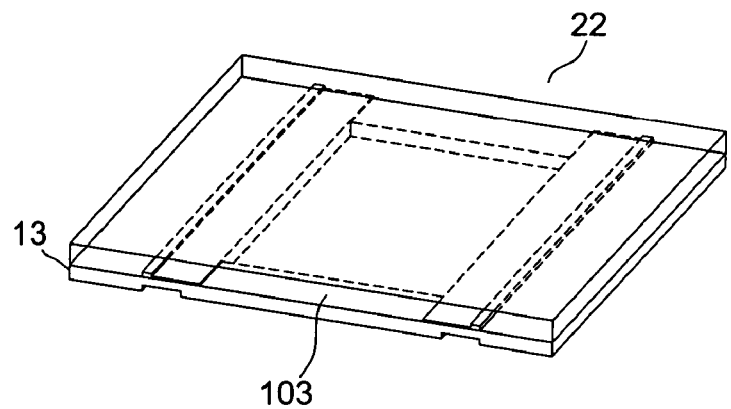
FIG. 2c depicts the surface of the plate with the positive film lying on the surface in one embodiment of the present invention.

FIG. 2a depicts that the film holding apparatus holds a positive film 22 to be scanned in accordance with one embodiment of the present invention. FIG. 2b depicts that the plate 13 carrying the positive film 22 (not shown) vertically moves downwards to be accommodated in the recess 102. The base 11 includes a first guiding device 104 disposed on the surface 101 surrounding the recess 102. In one exemplary embodiment, the first guiding device 104 includes at least two angle-typed flanges, as shown in FIG. 1a and FIG. 2b. FIG. 2c depicts that the surface 103 of the plate 13 receives the positive film 22 to be scanned in accordance with the embodiment. When the positive film 22 (not illustrated) is placed on the surface 103 of the plate 13, the plate 13 vertically moves for a distance, preferably the thickness of the positive film, towards the base 11 to be accommodated in the recess 102. When the plate 13 having the positive film thereon, is accommodated in the recess 102, the first guiding device 104 will restrain the positive film 22 from moving out of the recess 102 by utilizing at least two angle-typed flanges surrounding the film, and thus effectively affixes the position of the positive film 22. It should be noted that the distance the plate 13 vertically moves downwards equals about the thickness of the positive film.

Figure 2D:
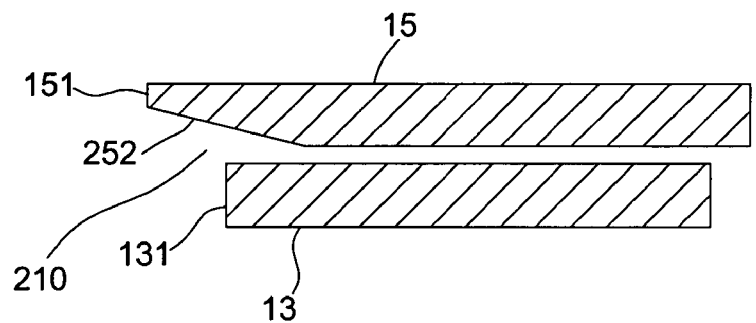
FIG. 2d is a partial cross-sectional view along line I-I' of FIG. 2a in accordance with one embodiment of the present invention.
Figure 2E:
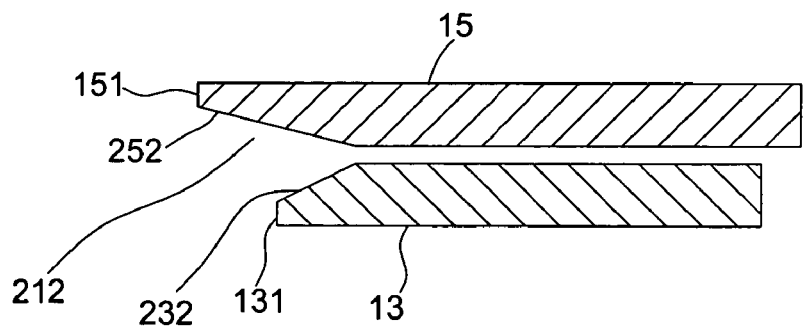
FIG. 2e is a partial cross-sectional view along line I-I' of FIG. 2a in accordance with another embodiment of the present invention.

In one exemplary embodiment, by opening the pressing unit 15 first, the user can place the positive film 22 on the surface 103 of the plate 13. In another exemplary embodiment, however, modifications can be made so that the user can access the film to be scanned without opening the pressing unit 15. Referring to FIGS. 1a, 2d, and 2e, the pressing unit 15 has a first side 151, and a first sloped portion 252 is provided on the first side 151 of the pressing unit 15. As shown in FIG. 2d, the first sloped portion 252 cooperates with the plate 13 to define an opening 210 that allows the access of the positive film 22. FIG. 2d is a partial cross-sectional view along line I-I' of FIG. 2a. Such an opening as shown in FIG. 2d allows the user to insert the positive film into the film holding apparatus without opening the pressing unit 15. Alternatively in another exemplary embodiment, as shown in FIGS. 1a and 2e, the plate 13 has a side 131 corresponding to the side 151 of the pressing unit 15. On the side 131, the plate 13 has a second sloped portion 232 corresponding to the first sloped portion 252 of the pressing unit 15. The second sloped portion 232 and the first sloped portion 252 define an opening 212 that allows the access of the positive film 22; it is not, necessary to open the pressing unit 15 first to place the positive film 22.

In general, the user can take out the positive film 22 by opening the pressing unit 15. However, in one exemplary embodiment, as shown in FIGS. 1a and 2a, the base 11 has a first opening 214 on the first side 111 of the base 11, and the plate 13 has a second opening 214 on the first side 131 of the plate. The first and the second openings 214 allow the user to reach the positive film 22 easily. Similarly in another exemplary embodiment, the pressing unit 15 has an opening 214 corresponding to the first side 111 of the base 11 on the first side 151 of the pressing unit 15, which allows the user to reach the positive film 22 easily.

Figure 3A:
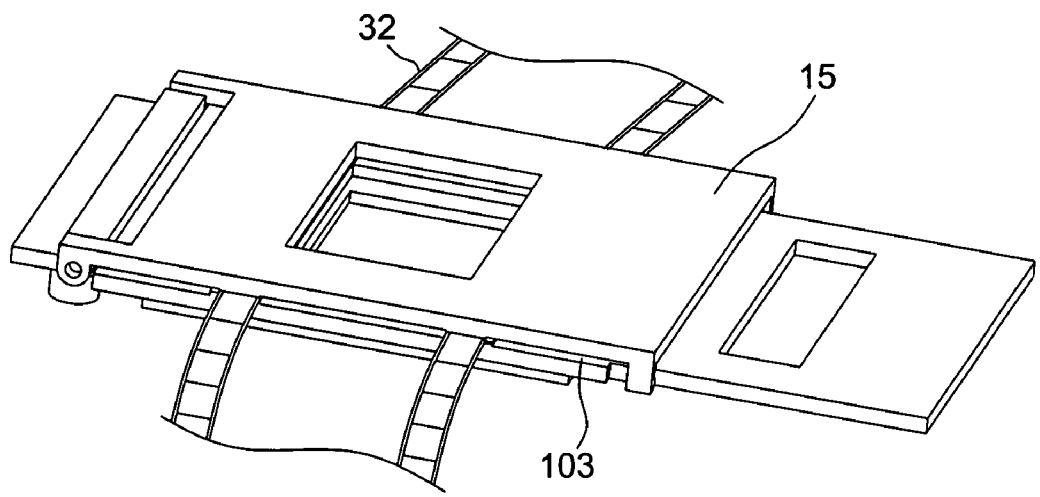
FIG. 3a depicts an exemplary film holding apparatus for holding a negative film to be scanned in accordance with one embodiment of the present invention.
Figure 3B:
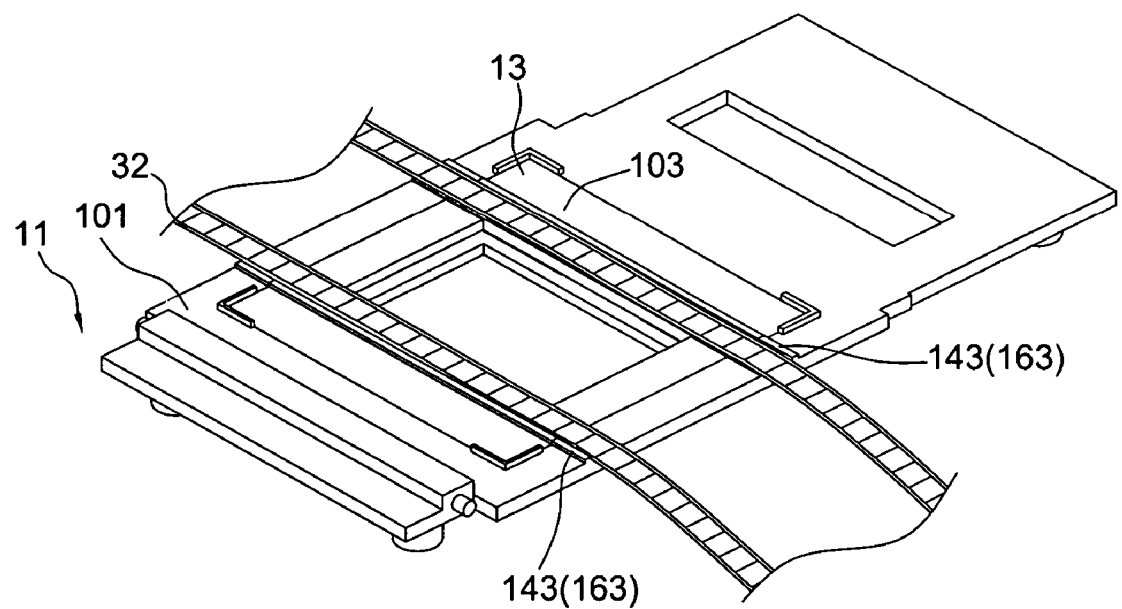
FIG. 3b depicts that the surface of the plate and the surface of the base are at the same level in one embodiment of the present invention.

FIG. 3a depicts that the exemplary film holding apparatus holds a negative film 32 to be scanned in accordance with another embodiment of the present invention. Referring to FIGS. 1a, 3a, and 3b, the plate 13 includes a second guiding device 143 disposed on the surface 103 of the plate for guiding the movement of the negative film 32. In a preferred embodiment, the second guiding device 143 includes two raised tracks. When the surface 103 of the plate 13 receives the negative film 32, the negative film 32 is constrained by the two raised tracks 143. Furthermore, when the pressing unit 15 engages with the base 11, the negative film 32 is held between the surface 103 of the plate 13 and the pressing unit 15, as shown in FIG. 3a. In other words, a space is formed between the surface 103 of the plate 13 and the pressing unit 15 so that the negative film 32 can be held inside. It should be noted that the surface 103 of the plate 13 having the negative film 32 is at the same level with the surface 101 of the base 11, as shown in FIG. 3b.

The user may place the negative film 32 on the surface 103 of the plate 13 by opening the pressing unit 15 first. However, in another embodiment, as shown in FIGS. 2d and 2e, the afore-mentioned opening 210 or 212 also allows the access of the negative film 32.

In addition, it should be appreciated that the user can take out the negative film 32 directly without additional operations since the negative film 32 of a row has stretched out of the base 11.

The present invention has been described above with reference to a preferred embodiment. However, those skilled in the art will recognize that many others may be implemented in alternate ways without departing from the scope of the present invention. Accordingly, the present exemplary embodiment is provided to illustrate rather than to limit. The present invention is not limited to the details described above and can be practiced with an equivalent modification or change defined as the appended claims.

I claim:

1. A film holding apparatus for use with a scanner, said film holding apparatus being configured to selectively hold a first film and a second film to be scanned, said first film being thicker than said second film, said film holding apparatus comprising:
   a base having a surface;
   a plate being vertically movably disposed above said surface of said base, said plate having a surface for selectively receiving said first film and said second film; and
   a pressing unit disposed above said plate;
   wherein said plate vertically moves for a distance towards said base as said surface of said plate receives said first film, and wherein said second film is held between said surface of said plate and said pressing unit as said surface of said plate receives said second film.

2. The film holding apparatus according to claim 1, wherein said pressing unit movably engages with said base.

3. The film holding apparatus according to claim 2, wherein said pressing unit has an end pivotally coupled to said base.

4. The film holding apparatus according to claim 2, wherein said pressing unit has an end having at least one latch engaged with said base.

5. The film holding apparatus according to claim 1, wherein said surface of said base comprises a recess, said plate is vertically movably accommodated in said recess.

6. The film holding apparatus according to claim 5, wherein said base further comprises a first guiding device, disposed on said surface surrounding said recess, for positioning said first film.

7. The film holding apparatus according to claim 6, wherein said first guiding device comprises at least two angle-typed flanges.

8. The film holding apparatus according to claim 1, further comprising an elastic element disposed between said surface of said base and said plate, wherein said elastic element has an end in contact with a bottom surface of said plate, and wherein said elastic element provides said plate with a resilient force as said plate vertically moves towards said base.

9. The film holding apparatus according to claim 8, wherein said elastic element is a spring leaf.

10. The film holding apparatus according to claim 8, wherein said elastic element is a spring.

11. The film holding apparatus according to claim 1, wherein said pressing unit has a first sloped portion on a first side of said pressing unit, said first sloped portion co-operates with said plate to define an opening allowing access to said first film.

12. The film holding apparatus according to claim 11, wherein said plate has a second sloped portion, corresponding to said first sloped portion of said pressing unit, on a first side of said plate, said second sloped portion and said first sloped portion forms an opening allowing access to said first film.

13. The film holding apparatus according to claim 11, wherein said opening selectively allows access to said second film.

14. The film holding apparatus according to claim 1, wherein said base has a first opening and said plate has a second opening corresponding to said first opening, said first and second openings allow a user to access to said film to be scanned.

15. The film holding apparatus according to claim 1, wherein said plate further comprises a second guiding device, disposed on said surface, for selectively guiding movement of said second film.

16. The film holding apparatus according to claim 15, wherein said second guiding device comprises two raised tracks, said second film is held between said surface of said plate and said pressing unit and constrained by said two raised tracks as said surface of said plate receives said second film and said pressing unit engages with said base.

17. The film holding apparatus according to claim 16, wherein said surface of said plate is in a same level as said surface of said base, as said surface of said plate receives said second film and said pressing unit engages with said base.

18. The film holding apparatus according to claim 1, wherein said first film is a positive film and said second film is a negative film.

* * * * *